United States Patent [19]

Furusawa et al.

[11] Patent Number: 5,050,227

[45] Date of Patent: Sep. 17, 1991

[54] METHOD OF AND APPARATUS FOR IMAGE SMOOTHING ALONG A TANGENTIAL DIRECTION OF A CONTOUR

[75] Inventors: Katsuhiko Furusawa; Makoto Hirosawa; Takashi Sakamoto, all of Tenjinkitamachi, Japan

[73] Assignee: Dainippon Screen Mfg. Co., Ltd., Kyoto, Japan

[21] Appl. No.: 446,888

[22] Filed: Dec. 6, 1989

[30] Foreign Application Priority Data

Dec. 15, 1988 [JP]  Japan .................................. 63-317337

[51] Int. Cl.$^5$ ........................... G06K 9/40; G06K 9/48
[52] U.S. Cl. ........................................ 382/54; 382/16; 382/22; 358/448
[58] Field of Search ............................ 382/54, 22, 16; 358/447, 448

[56] References Cited

U.S. PATENT DOCUMENTS

| | | | |
|---|---|---|---|
| 4,124,870 | 11/1978 | Schatz et al. | 382/54 |
| 4,691,366 | 9/1987 | Fenster et al. | 382/54 |
| 4,724,489 | 2/1988 | Oldershaw | 358/447 |
| 4,817,174 | 3/1989 | Nakatani | 382/22 |
| 4,827,533 | 5/1989 | Tanaka | 382/54 |

Primary Examiner—Leo H. Boudreau
Assistant Examiner—Steven P. Fallon
Attorney, Agent, or Firm—Lowe, Price, LeBlanc and Becker

[57] ABSTRACT

Smoothing in a tangential direction of a contour and detail enhancement in its perpendicular direction are simultaneously achieved with spatial filters having prescribed weighing factor distribution. An area including a contour is first designated, and a direction of the contour is detected. A weighted mean value of an image signal is computed with weighing factors distributed in the spatial filter. The weighing factors have an effect of smoothing in the tangential direction of the contour and an effect of detail enhancement in the perpendicular direction.

16 Claims, 12 Drawing Sheets

| -1 | 0 | 1 |
|---|---|---|
| -2 | 0 | 2 |
| -1 | 0 | 1 |

FIG. 4B

| 1 | 2 | 1 |
|---|---|---|
| 0 | 0 | 0 |
| -1 | -2 | -1 |

FIG. 4C

| -2 | -1 | 0 |
|---|---|---|
| -1 | 0 | 1 |
| 0 | 1 | 2 |

FIG. 4D

| 0 | -1 | -2 |
|---|---|---|
| 1 | 0 | -1 |
| 2 | 1 | 0 |

| -1 | 2 | -1 |
|---|---|---|
| -1 | 2 | -1 |
| -1 | 2 | -1 |

SEF1a

X: TANGENTIAL DIRECTION
Y: NORMAL DIRECTION

FIG.6B

| -1 | -1 | -1 |
|---|---|---|
| 2 | 2 | 2 |
| -1 | -1 | -1 |

SEF1b

FIG.6C

| -1 | -1 | 2 |
|---|---|---|
| -1 | 2 | -1 |
| 2 | -1 | -1 |

SEF1c

FIG.6D

| 2 | -1 | -1 |
|---|---|---|
| -1 | 2 | -1 |
| -1 | -1 | 2 |

SEF1d

SEF1a ~ SEF1d: S/E FILTER

DRS: CONTOUR-DIRECTION SIGNAL

| -b | 2b | -b |
|---|---|---|
| -b | 2b+1 | -b |
| -b | 2b | -b |

SEF2a

FIG. 11B

| -b | -b | -b |
|---|---|---|
| 2b | 2b+1 | 2b |
| -b | -b | -b |

SEF2b

FIG. 11C

| -b | -b | 2b |
|---|---|---|
| -b | 2b+1 | -b |
| 2b | -b | -b |

SEF2c

FIG. 11D

| 2b | -b | -b |
|---|---|---|
| -b | 2b+1 | -b |
| -b | -b | 2b |

SEF2d

SEF2a~SEF2d : S/E FILTER

SEF3a~SEF3d : S/E FILTER

METHOD OF AND APPARATUS FOR IMAGE SMOOTHING ALONG A TANGENTIAL DIRECTION OF A CONTOUR

BACKGROUND OF THE INVENTION

1. Field of the Invention

The present invention is related to a method of and an apparatus for retouching an image to reform a contour in the image.

2. Description of the Prior Art

In reproducing an original image, a reading apparatus such as an image scanner firstly scans and reads a color original or a monochrome original to obtain an image signal. The image signal is subjected to digital image processing, and a reproduced image represented by the processed image signal is displayed on a display means such as a CRT. During this procedure, a noise component is added to the image signal due to so-called sampling processing, detail enhancement processing, which are executed in a reading apparatus, an image processing apparatus or a recording apparatus, and defects are added to the original.

The noise component makes contours, lines and curves in an image uneven and broken. The contour denotes a portion of an image where a large difference of density exists. This phenomenon caused by the noise component is generally called "JAG" in the field.

In order to prevent the JAG, some techniques are developed as described in Japanese Patent Publication Gazette No. 63-49426, Japanese Patent Laying Open Gazette No. 61-95669, and the like.

The technique disclosed in Japanese Patent Publication Gazette No. 63-49426 is based on the following smoothing processing: a weighted signal is obtained by weighting density signals about a pixel and its adjacent pixels with respective weighting factors and by adding them together, and the weighted signal is compared with a prescribed threshold value, whereby an area of medium density is formed at a contour portion.

The technique disclosed in Japanese Patent Laying Open Gazette No. 61-95669 first obtains a differential signal between a sharp signal and an unsharp masking signal. The differential signal is compared with a prescribed slicing levels of plus and minus, whereby a ratio of the magnitude of detail enhancement processing to that of smoothing processing is adjusted.

However, the above stated techniques pay no regard to the directions of the detail enhancement and the smoothing. Therefore, the reproduced image obtained thereby seems dimmer all over than the original image. Further, since the entire image area is processed in these techniques, the processing is performed even in the areas where the JAG does not exist if the threshold value (or a slicing level) is incorrectly set, whereby the reproduced image seems unnatural.

There is another technique where the magnitude of detail enhancement is maintained comparatively small in order to prevent the JAG. According to this technique, however, the entire reproduced image seems dimmer, and the JAG is not well prevented.

SUMMARY OF THE INVENTION

The present invention is directed to a method of and an apparatus for retouching an image through correcting image data, comprising the steps of: (a) preparing image data representing an image with respect to each pixel; (b) designating a retouching area in said image to be retouched; (c) detecting a tangential direction of a contour included in the retouching area; and (d) computing a weighted mean value of the image data with respect to each pixel and a prescribed area around each pixel in the retouching area while using weighting factors distributed in the tangential direction, the weighting factors smoothing the image data in the tangential direction, thereby producing corrected image data representing a retouched image on the basis of the weighted mean value.

According to an aspect of the present invention, the weighting factors are further distributed in a normal direction perpendicular to the tangential direction, and the weighting factors enhance detail of the image in the second direction.

According to another aspect of the present invention, the weighting factors are arranged in a pixel matrix of a prescribed size.

According to still another aspect of the present invention, a first group of the weighting factors assigned to first pixels, which form a line of a prescribed width drawn through a central pixel of the pixel matrix in the tangential direction, has a first sign, and a second group of the weighting factors assigned to second pixels other than the first pixels in the pixel matrix has a second sign opposite to the first sign.

Preferably, the image data include a plurality of color component data, and the step (d) comprises the steps of: (d-1) computing a second weighted mean value of the plurality of color component data with respect to each pixel in the retouching area, (d-2) computing the weighted mean value on the basis of the second weighted mean value, and (d-3) adding the weighted mean value to each of the plurality of color component data to produce the corrected image data including corrected color component data.

Instead, the image data may include a plurality of color component data, and the step (d) may comprise the steps of: (d-1) selecting a minimum value of the color component data with respect to each pixel in the retouching area, (d-2) computing the weighted mean value on the basis of the minimum value, and (d-3) adding the weighted mean value to each of the plurality of color component data to produce the corrected image data including corrected color component data.

As still a further alternative, the image data may include a plurality of color component data, and the step (d) may comprise the steps of: (d-1) computing the weighted mean value with respect to each of the plurality of color component data, and (d-2) adding the weighted mean value with respect to each of the plurality of color component data to each of the plurality of color component data to thereby produce the corrected image data including corrected color component data.

Accordingly, an object of the present invention is to obtain a reproduced image which appears sharp and natural while the JAG is prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
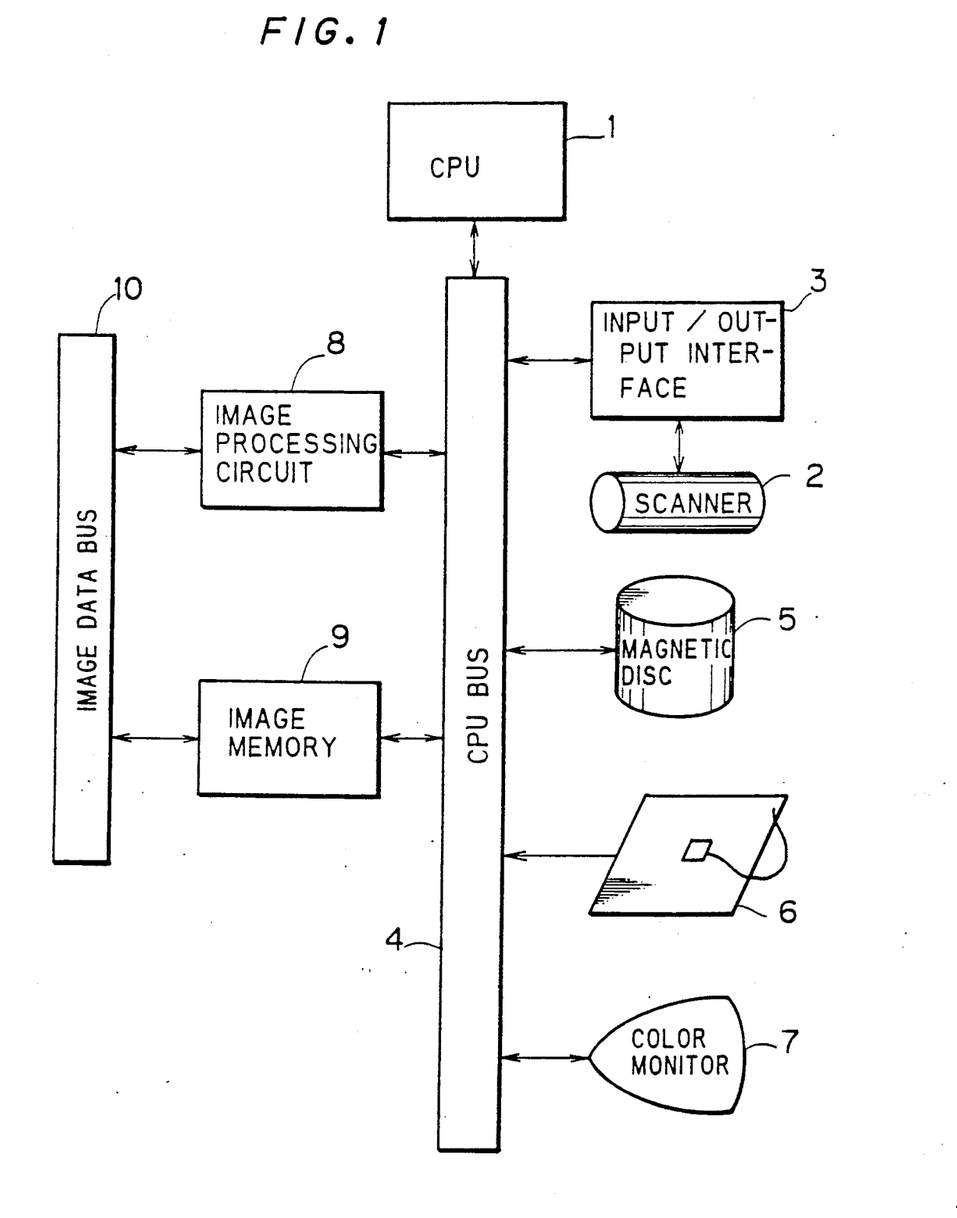
FIG. 1 is a block diagram showing the structure of a contour retouching apparatus according to a preferred embodiment of the present invention.

FIG. 1 is a block diagram showing the structure of a contour retouching apparatus for retouching contours in an image according to a preferred embodiment of the present invention. The apparatus comprises a CPU 1 for controlling the entire apparatus. The apparatus further comprises an input/output interface 3, a magnetic disc 5, a digitizer 6, a color monitor 7, an image processing circuit 8, and an image memory 9, all of which are connected to the CPU 1 through a CPU bus 4. Further, a scanner 2 is connected to the interface 3, and an image data bus 10 is connected to the image processing circuit 8 and the image memory 9.

The scanner 2 scans and reads an original to obtain image data, which is supplied to the CPU bus 4 through the interface 3. The magnetic disc 5 stores some image data and supplies them to the other elements as described later. An operator inputs or designates coordinates of a position-to-be-processed with the digitizer 6. The color monitor 7 displays an image under processing with sampled image data, an image area to be subjected to operational processing described later, a cursor for designating coordinates of the position-to-be-processed, or the like.

The image processing circuit 8 executes retouching processing described later on image data representing an image area designated by an operator. The image data representing the designated image area are supplied from the magnetic disc 5 to the image memory 9 through the CPU bus 4, and stored therein temporarily. The image data bus 10 transmits image data between the image processing circuit 8 and the image memory 9 at a high speed. Processed image data are stored in the magnetic disc 5, and read out on demand to be supplied to the scanner 2 through the input/output interface 3.

Figure 2:
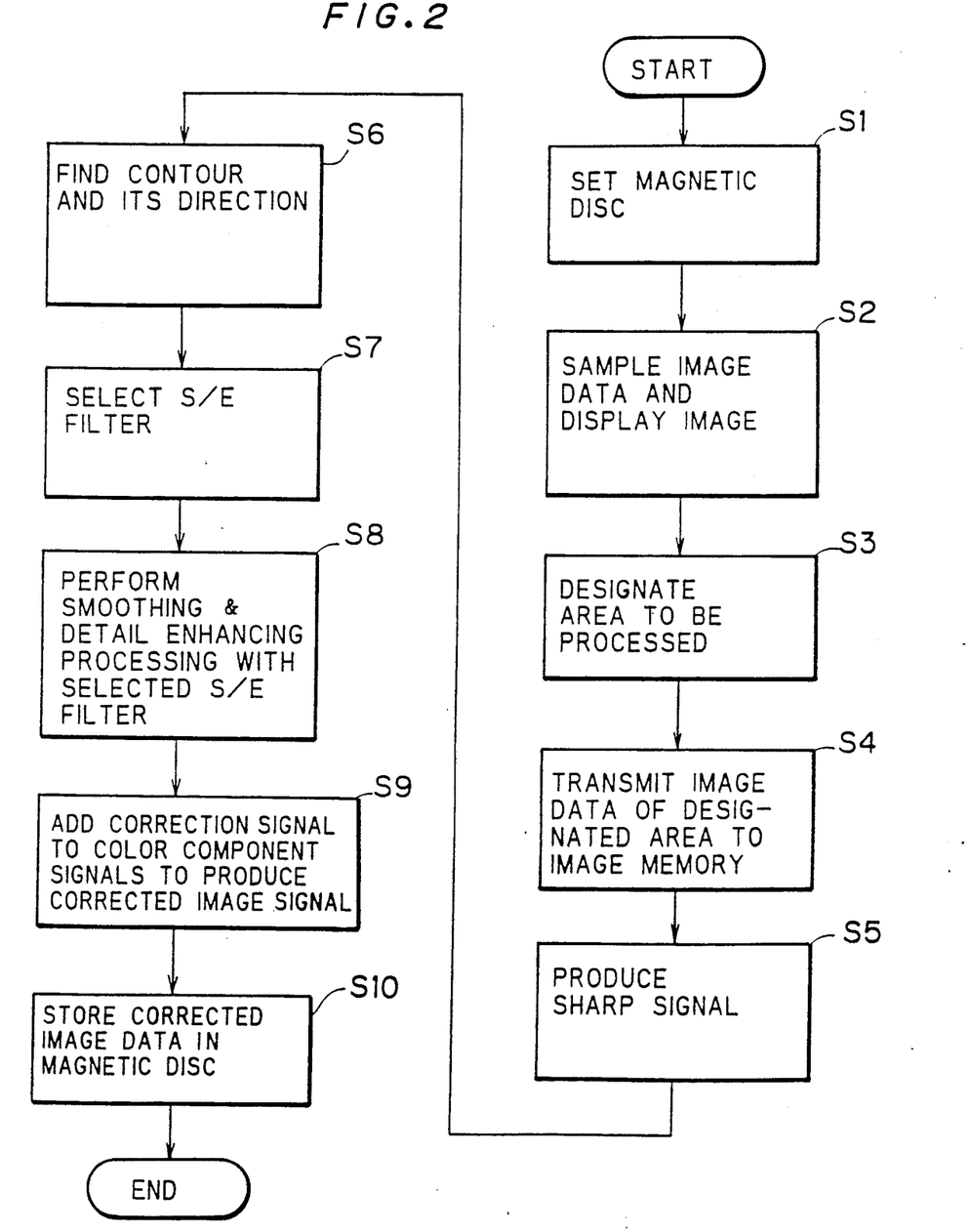
FIG. 2 is a flow chart showing the procedure of the preferred embodiment.

FIG. 2 is a flow chart showing the procedure of contour retouch processing according to the preferred embodiment of the present invention.

At a step S1, the magnetic disc 5 storing image data to be processed is set in the contour retouching apparatus.

At a step S2, the image data stored in the magnetic disc 5 are sampled at a prescribed rate corresponding to the resolution of the color monitor 7. Consequently, an image to be processed, which is represented by the sampled image data, is displayed on the color monitor 7.

Figure 3A:
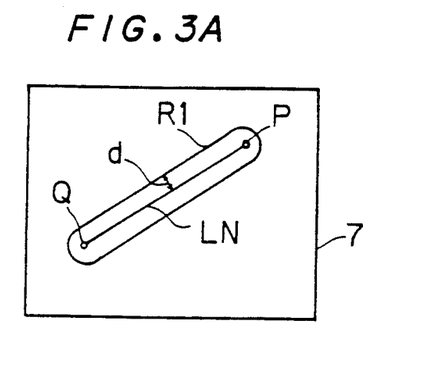
FIGS. 3A and 3B illustrate designated areas to be processed.
Figure 3B:
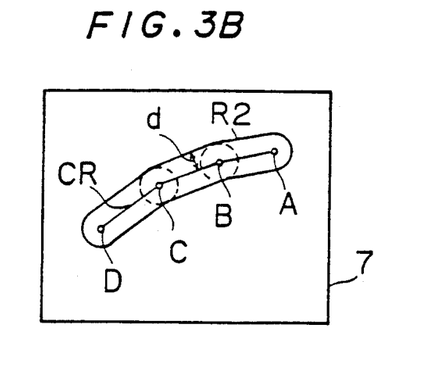

At a step S3, an operator investigates the image displayed on the color monitor 7, and designates an area to be processed in the contour retouch. The area to be processed is so designated that it includes a contour to be reformed. The designation is done as follows, for example:

The operator inputs coordinates specifying the area to be processed with the digitizer 6. A cursor displayed on the color monitor 7 moves according to the coordinates to form a segment to be used in designating the area to be processed. Then, a surrounding area of the segment is designated as the area to be processed. FIG. 3A illustrates a segment LN of a straight line and its surrounding area R1 displayed on the color monitor 7. FIG. 3B illustrates a segment CR of a curve and its surrounding area R2 displayed on the color monitor 7. In order to designate the surrounding area R1 of the segment LN shown in FIG. 3A, the operator inputs coordinates of the points P and Q with the digitizer 6. As a result, an area within a prescribed distance d from the segment LN is specified as the area R1 to be processed. In order to designate the surrounding area R2 of the segment CR shown in FIG. 3B, the operator inputs coordinates of points A, B, C and D on the segment CR. Line segments drawn through adjacent pairs of the points A, B, C and D, which are approximate to the segment CR, are obtained, and an area within the distance d from the line segments is specified as the area R2 to be processed. The operator can adjust the size and the shape of the designated area by desirably setting the points on the segment and the value of the distance d.

The luminace and/or the color tone of the designated area R1 or R2 may be changed so that the operator can recognize the designated area easily.

After the designation at the step S3, the image data representing the designated area are transmitted from the magnetic disc 5 to the image memory 9 at a step S4.

At a step S5, a sharp signal is produced with respect to each pixel from the image data representing the designated area, stored in the image memory 9. When the image data include yellow (Y), magenta (M), cyan (C) and black (K) components, the sharp signal S is defined by the following equation (1) or (2):

$$S = a_1 \times Y + a_2 \times M + a_3 \times C + a_4 \times K \tag{1}$$

where $a_1$ through $a_4$ are constants.

$$S = MIN[Y, M, C] \tag{2}$$

where the operator "MIN" means to take the minimum value.

The equation (1) gives the sharp signal S as a weighted mean value of the components Y, M, C and K. The equation (2) gives the sharp signal S as the minimum value among the components Y, M and C.

At a step S6, it is judged whether or not the designated area R1 or R2 includes a contour, and a direction in which the contour, if any, is extending is found. FIGS. 4A through 4D illustrate edge-detection filters employed in this processing. The four filters are 3×3 pixel matrixes and have different distribution of weighting factors from each other. Edge-detection data are produced with respect to each filter by weighting the values of the sharp signals for the nine pixels in each filter with the weighting factors and adding them up, as described later in detail. On the basis of the edge-detection data obtained by the respective four filters, a contour in the designated area and its direction are found. FIGS. 4A through 4D show the directions x to be found with the respective filters.

Figure 4A:
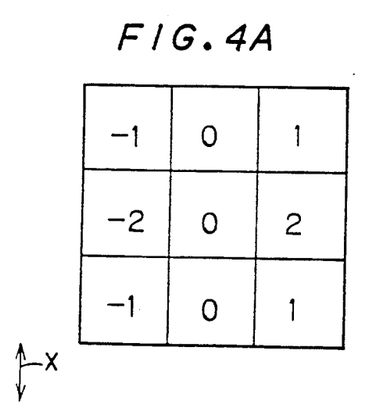
FIGS. 4A through 4D illustrate weighting factor distribution of edge-detection filters.
Figure 5A:
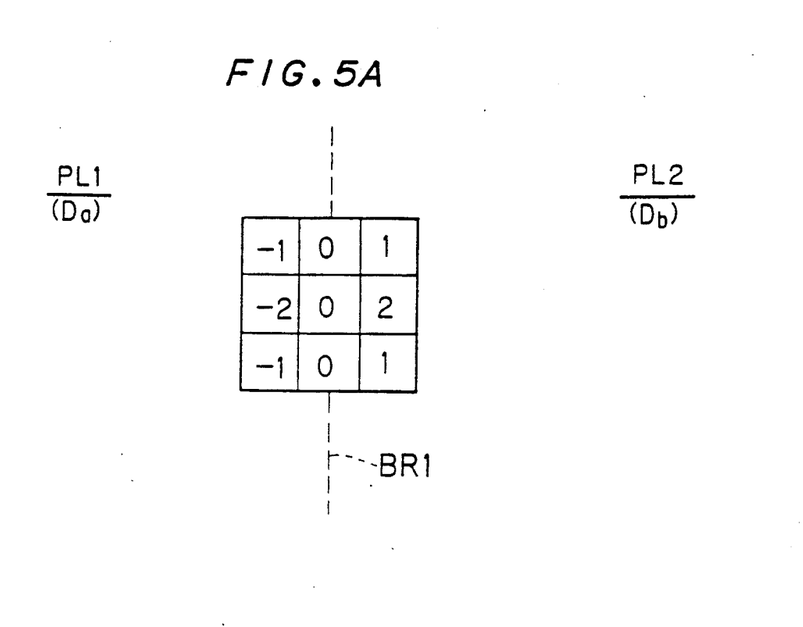
FIGS. 5A and 5B illustrate edge-detection filters placed on a part of an image area.
Figure 5B:
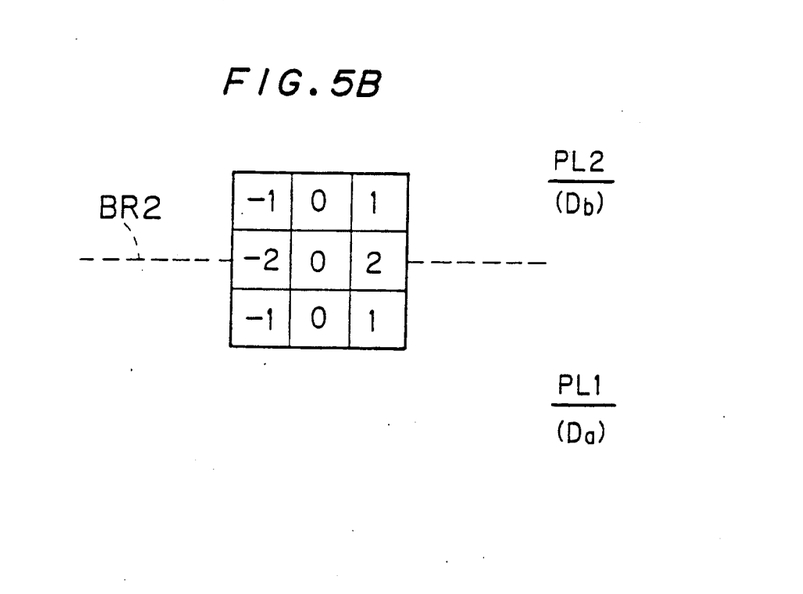

FIG. 5A and 5B illustrate part of an image, on which the filter shown in FIG. 4A is applied. Each image area in FIGS. 5A and 5B consists of two uniform areas PL1 and PL2, which are represented by respective image data $D_a$ and $D_b$. In FIG. 5A, a center pixel of the filter of FIG. 4A is placed on a border BR1 between the uniform areas PL1 and PL2. In FIG. 5B, the center pixel of the filter is placed on a border BR2.

The edge-detection data ED for the case shown in FIG. 5A are produced as follows:

$$ED = -4 \times D_a + 4 \times D_b$$
$$= 4 \times (D_b - D_a)$$

Since the image data $D_a$ and $D_b$ have different values, the edge-detection data ED has a non-zero value of plus or minus.

On the other hand, the edge-detection data ED for the case shown in FIG. 5B has a value of zero, because the weighted image data are added together to cancel out each other.

Figure 4B:
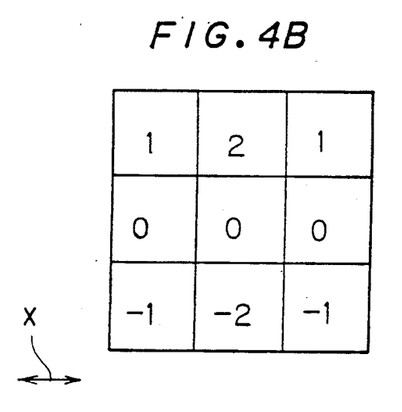
Figure 4C:
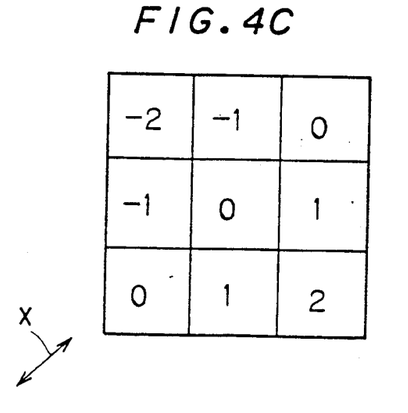
Figure 4D:
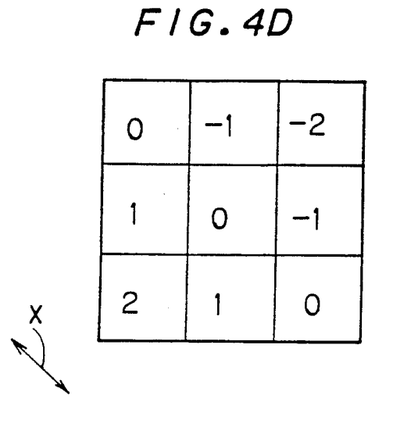

In other words, the edge-detection data ED which is given by the edge-detection filter shown is applied to the border BR1 (or a contour) extending in the perpendicular direction. Similarly, the filter shown in FIG. 4B gives the data ED the largest absolute value with respect to a border extending in the horizontal direction, the filter shown in FIG. 4C with respect to a border extending in an oblique direction from upper-right to lower-left, and the filter shown in FIG. 4D with respect to a border extending in another oblique direction from upper-left to lower-right.

The edge-detection filters are applied to the designated area R1 or R2 to detect a contour. Namely, the central pixel of the 3×3 matrix of each filter is sequentially placed at each pixel in the designated area, and the values of the image signal for the 3×3 matrix are weighted and added together. If the absolute value of the edge-detection data thus obtained is greater than a prescribed threshold value TH1, the central pixel is judged to be on a border (or a contour), that is, it is judged that the designated area includes a contour. Further, the direction of the contour is found to be one particular to the filter which gives the largest absolute value of the edge-detection data.

In the above example, the direction of the contour is selected from the four directions. However, it can be selected from a greater number of directions when a 5×5 pixel matrix, a 7×7 pixel matrix and the like are employed as the filters.

If the designated area includes a linear contour, the direction of the contour can be found on the basis of the coordinates of the point designated with the digitizer 6, such as the point P and Q shown in FIG. 3a, instead of the above processing.

After the detection of a contour and its direction at the step S6, an S/E filter (smoothing/enhancing filter) is selected at a step S7 on the basis of the direction of the contour. The S/E filter denotes a spatial filter employed in smoothing image data in the tangential direction of the contour and enhancing details in the normal direction of the contour.

Figure 6A:
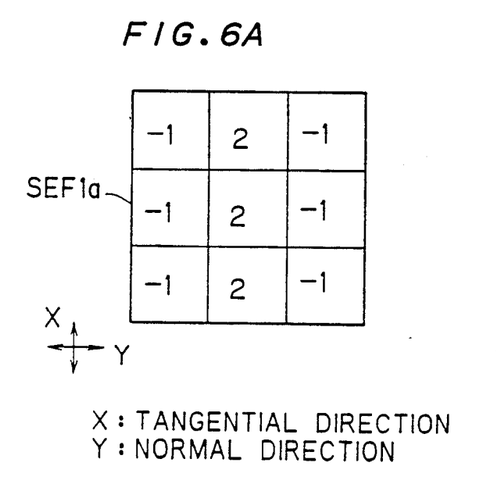
FIGS. 6A through 6D and 7A through 7D illustrate other types of weighting factor distribution of edge-detection filters.
Figure 6B:
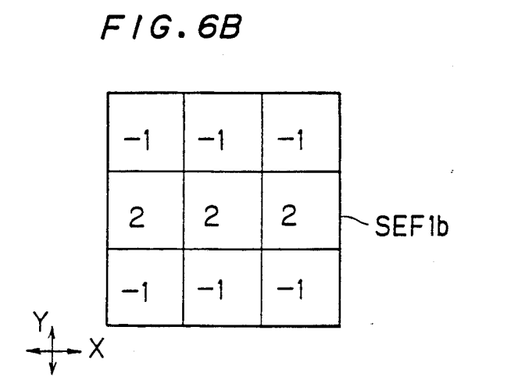
Figure 6C:
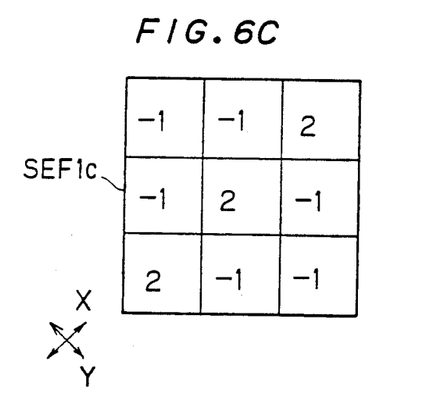
Figure 6D:
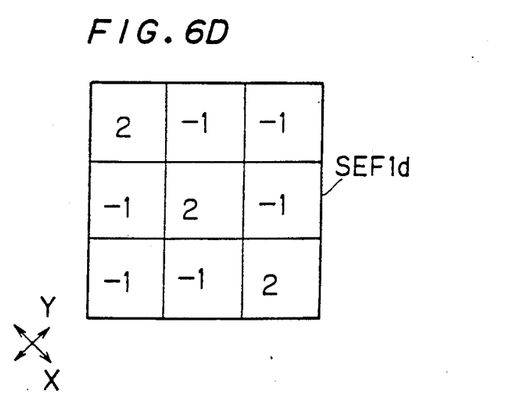
Figure 7A:
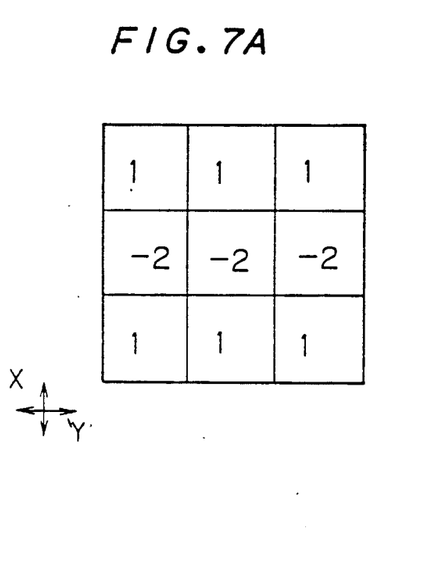
Figure 7B:
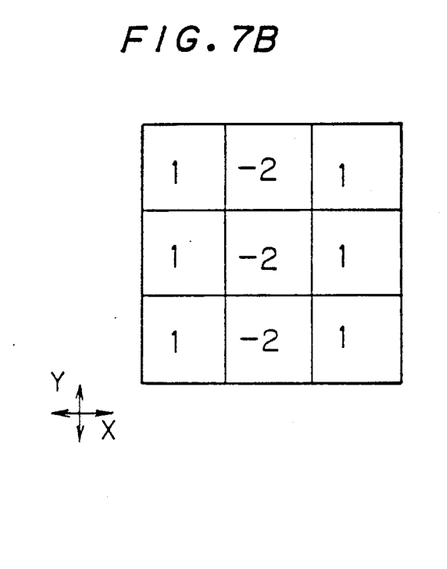
Figure 7C:
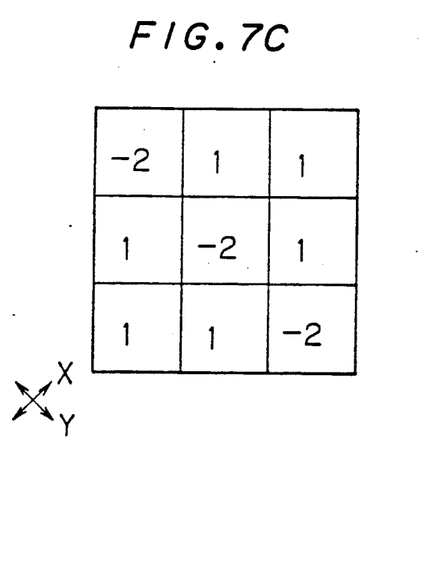
Figure 7D:
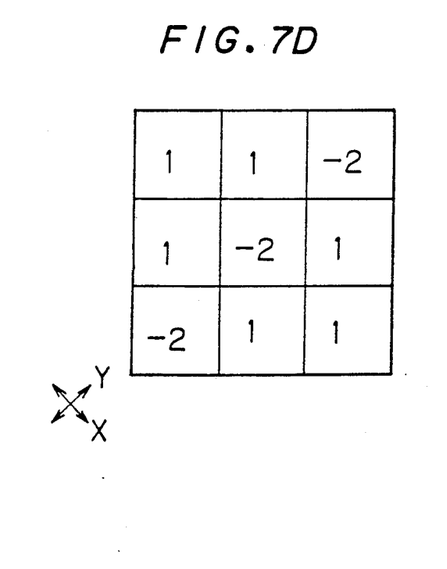

FIGS. 6A through 6D illustrate the S/E filters SEF1a–SEF1d employed at the step S7. The S/E filters SEF1a–SEF1d have respective distribution of weighting factors. The smoothing processing is performed in a direction X shown in these figures, which corresponds to the tangential direction of a contour. The detail enhancement is preformed in a direction Y, which corresponds to the normal direction of a contour. These S/E filters have the distribution of weighting factors which are positive for the central pixel and pixels adjacent to the central pixel in the direction X and which are negative for the other pixels. One of the S/E filters SEF1a–SEF1d is selected according to the direction of the contour detected to the step S6. For example, when the edge-detection filter shown in FIG. 4A gives the largest absolute value of the edge-detection data at some pixel, the S/E filter SEF1a shown in FIG. 6a is selected for the pixel. Namely, one of the S/E filters is selected whose peculiar direction X agrees with the peculiar direction x of the edge-detection filter which gives the largest absolute value of the edge-detection data.

Although the S/E filters shown in FIGS. 6A through 6D have both effects of smoothing and detail enhancement, one of filters shown in FIGS. 7A through 7D may be selected additionally and used to intensify the smoothing effect. These filters have striking effects of smoothing in the tangential direction X. These filters may be used in place of the S/E filters shown in FIGS. 6A through 6D instead. Further, the other kinds of filters only having the detail enhancement effect in the normal direction Y can be used in place of the S/E filters.

At a step S8, masking processing (or smoothing and detail enhancement processing) is performed with respect to each pixel in the designated area with the S/E filter selected at the step S7. Namely, the values of sharp signals S for the pixels in the selected S/E filter are weighted with the respective weighting factors of the selected S/E filter and added together, whereby a correction signal for the central pixel of the filter is produced. In order to prevent the retouched image from being unnatural because of large differences of image data between the designated area and its surrounding area, the weighting factors of the selected S/E filter may be decreased as the central pixel comes closer to the outline of the designated area; this is substantially achieved through multiplying the correction signal by a variable coefficient whose value decreases as the central pixel of the filter comes closer to the outline.

At a step S9, the correction signal obtained at the step S8 is added to the respective color components Y, M, C and K to produce corrected image signals for the respective color components Y, M, C and K.

St a step S10, the corrected image data thus obtained with respect to each pixel in the designated area are stored in the magnetic disc 5; thus the processing of contour retouch is completed. The corrected image data stored in the magnetic disc 5 are read out on demand and outputted to a color monitor 7 or other devices.

Now main circuits for performing the above processing will be described below.

Figure 8:
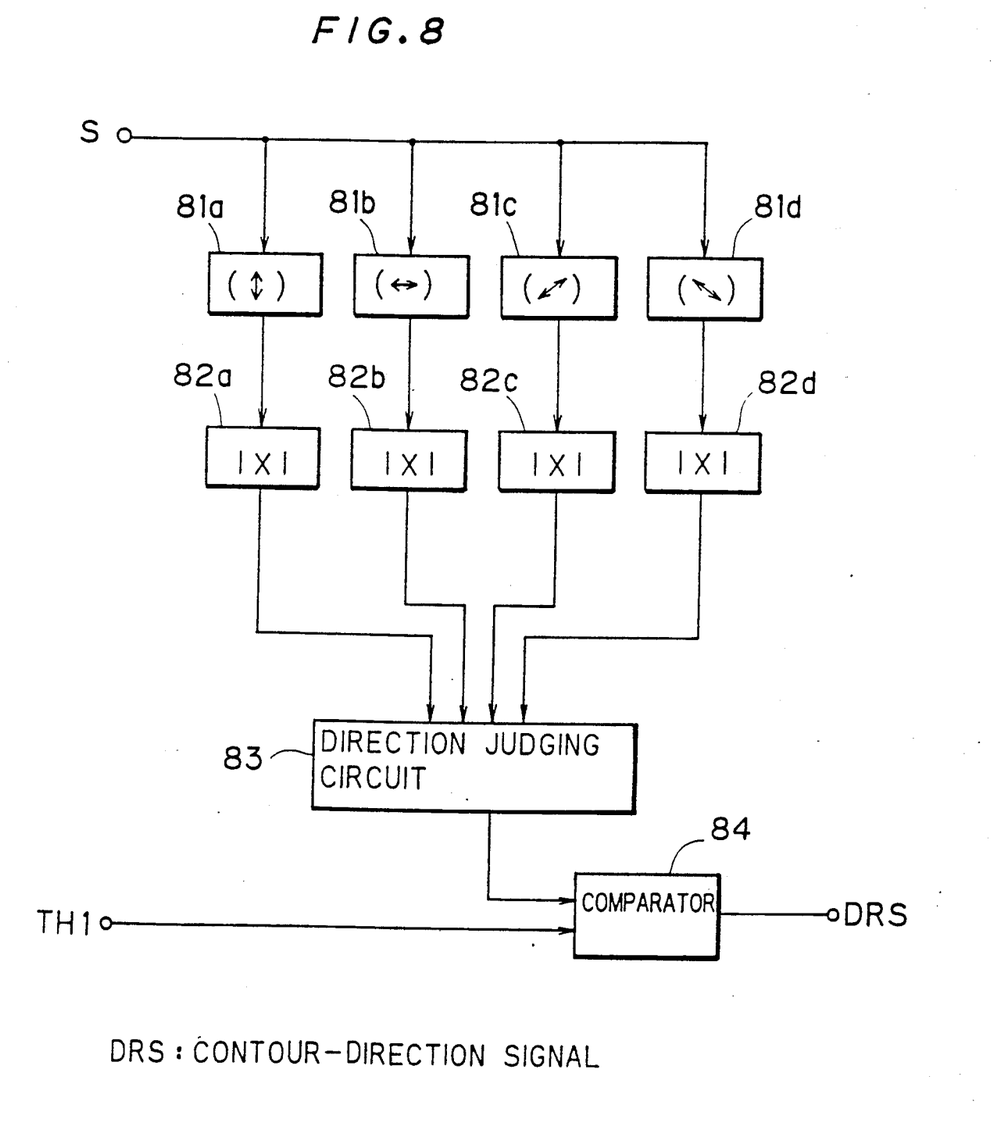
FIG. 8 is a block diagram showing the structure of a direction detecting circuit.

FIG. 8 is a block diagram showing the structure of a direction detecting circuit for detecting a contour and its direction with the edge-detection filters at the step S6. The sharp signals for 3×3 pixel matrix are supplied to each of four filter circuits 81a through 81d, which perform the masking processing with the edge-detection filters shown in FIGS. 4A through 4D, respectively. The filters in the filter circuits 81a-81d are ones for detecting a contour extending in the perpendicular direction, in the horizontal direction, in the direction from upper-right to lower-left, and in the direction from upper-left to lower-right, respectively, as described before. Actually, the filter circuits 81a-81d produce the edge-detection signals and supply them to absolutizing circuits 82a-82d, respectively. The absolutized edge-detection signals are supplied to a direction judging circuit 83, which finds the largest value of the absolutized edge-detection signals. The absolutized edge-detection signal having the largest value is supplied to a comparator 84 and compared with the threshold value TH1. If the largest value is smaller than the threshold value TH1, it is judged that the current pixel (or the central pixel of the edge-detection filter) is not on a contour. On the other hand, if the largest value is greater than the threshold value TH1, it is judged that the current pixel is on a contour. In the latter case, the comparator 84 outputs a contour-direction signal DRS indicating the direction of the contour on the basis of the peculiar direction of the filter in the filter circuit which produces the edge-detection signal having the largest absolute value.

Figure 9:
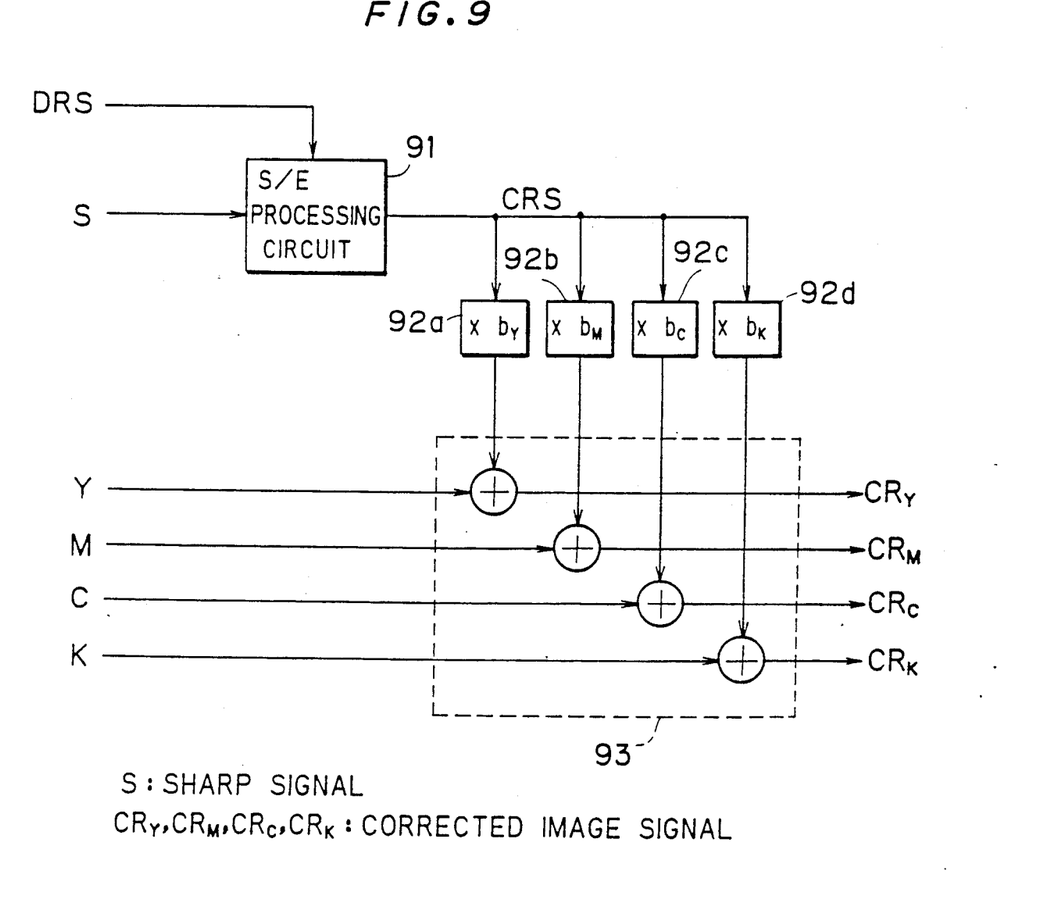
FIG. 9 is a block diagram showing the structure of a correction circuit.

FIG. 9 is a block diagram showing the structure of a correction circuit for performing the steps S7 through S9.

The contour-direction signal DRS is supplied from the comparator 84 shown in FIG. 8 to an S/E processing circuit 91. The S/E processing circuit 91 comprises the S/E filters SEF1a-SEF1d for respective directions of a contour and selects one of the S/E filters in response to the contour direction signal DRS. The S/E processing circuit 91 also receives the sharp signal S and executes the masking processing (or the smoothing and detail enhancement processing) on the sharp signal with the selected S/E filter to produce a correction signal CRS. The correction signal CRS is supplied to each of multiplication units 92a through 92d, which correspond to respective color components Y, M, C and K, and multiplied therein by respective coefficients $b_Y$, $b_M$, $b_C$ and $b_K$. An adder 93 adds the results of the multiplication to respective color component signals Y, M, C and K to produce corrected image signals $CR_Y$, $CR_M$, $CR_C$ and $CR_K$ for the respective color components.

Figure 10:
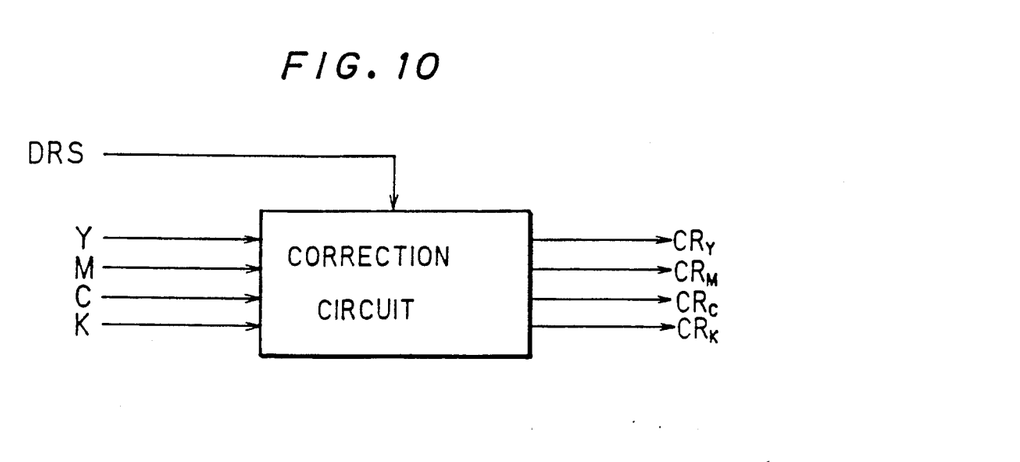
FIG. 10 is a block diagram showing another structure of a correction circuit.
Figure 11A:
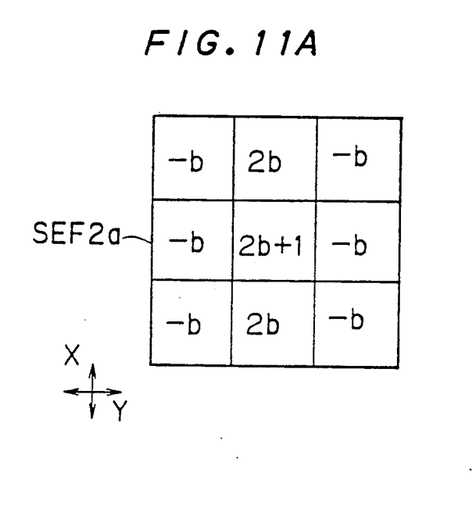
FIGS. 11A through 11D illustrate weighting factor distribution of spatial filters employed in the circuit of FIG. 10.
Figure 11B:
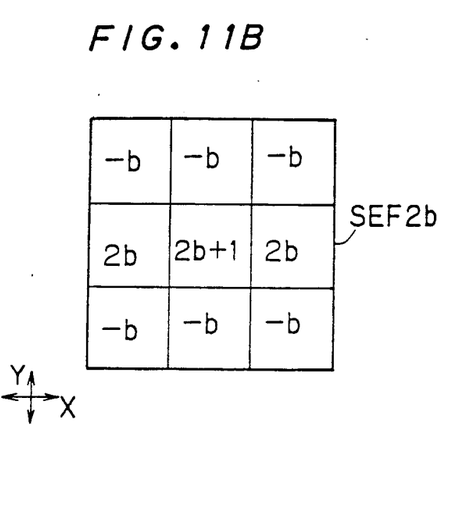
Figure 11C:
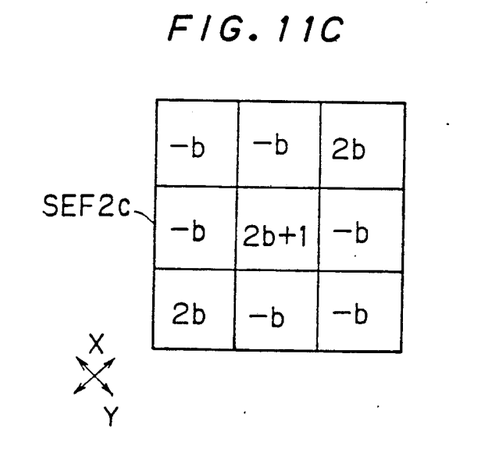
Figure 11D:
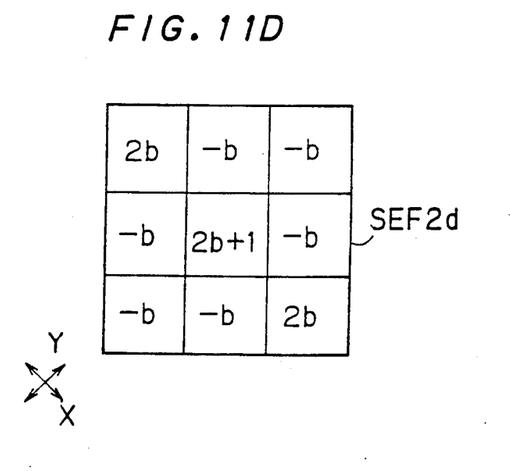
Figure 12A:
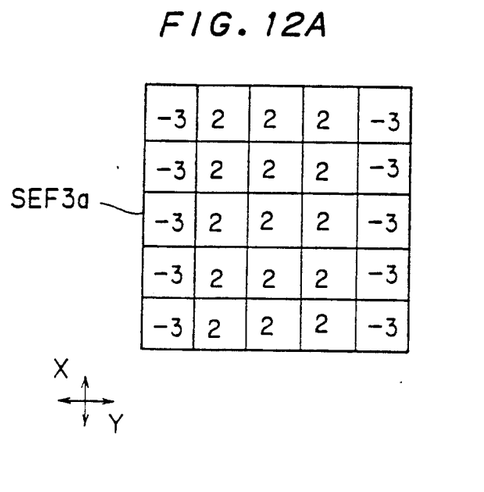
FIGS. 12A through 12D illustrate other weighting factor distribution of spatial filters employed in the preferred embodiment of the present invention.
Figure 12B:
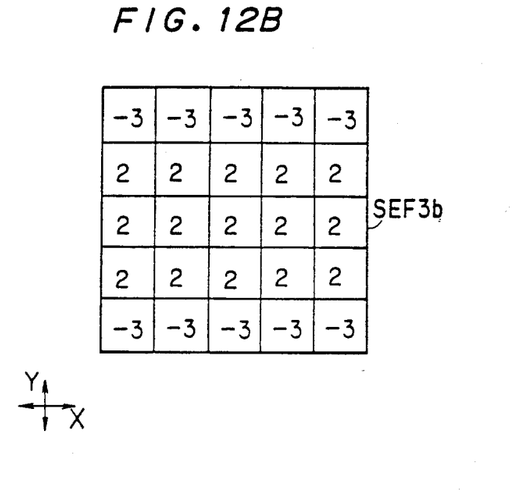
Figure 12C:
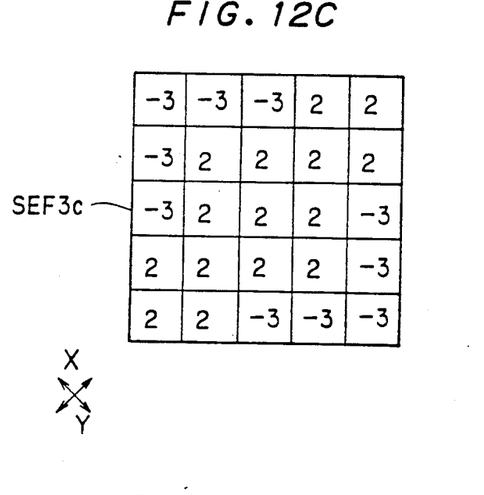
Figure 12D:
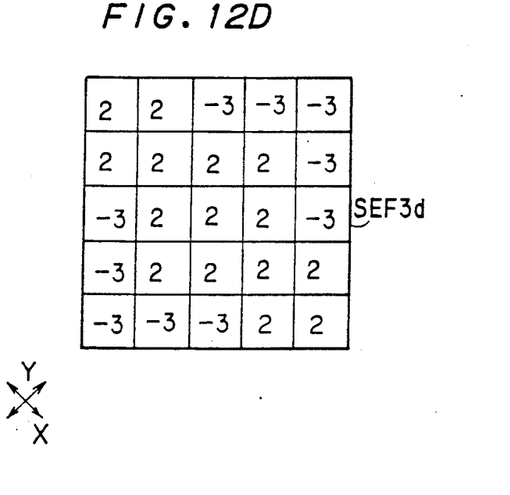

FIG. 10 is a block diagram showing the structure of another correction circuit having the same function as the circuit shown in FIG. 9. The correction circuit of FIG. 10 produces the corrected image signals $CR_Y$, $CR_M$, $CR_C$ and $CR_K$ directly from the respective color component signals Y, M, C and K. In this circuit, the color component signals Y, M, C and K are also used as respective sharp signals instead of the common sharp signal S in FIG. 9.

FIGS. 11A through 11D illustrate the distribution of the weighting factors of S/E filters SEF2a-SEF2d which are employed in the correction circuit shown in FIG. 10. The tangential direction X of a contour, in which the smoothing processing is performed, and the normal direction Y of a contour, in which the contour enhancement is performed, are the same as those of the S/E filters SEF1a-SEF1d. The weighting factors except for one for the cental pixel have values which are obtained by multiplying the corresponding weighting factors of the S/E filters SEF1a-SEF1d by a coefficient b; this corresponds to the operation in the multiplication units 92a-92d shown in FIG. 9. The weighing factor for the central pixel has a value which is obtained by multiplying the weighting factor (equals two) of the S/E filters SEF1a-SEF1d by the coefficient b and adding one. The addition corresponds to the operation of the adder 93 shown in FIG. 9.

FIGS. 12A through 12D illustrate the distribution of the weighting factors of still other S/E filters SEF3a-SEF3d. The directions X and Y are the tangential direction and the normal direction of a contour, respectively, in the same manner as the above described S/E filters. With these S/E filters SEF3a-SEF3d, the smoothing processing is achieved in a first area which is within a prescribed small distance (corresponding to one pixel in FIGS. 12A-12D) from the contour in the normal direction, while the detail enhancement is achieved in a second area surrounding the first area. As shown in FIGS. 12A through 12D, the S/E filters SEF3a-SEF3d utilizes a 5×5 pixel matrix. The weighting factors for the pixels within one pixel width in the normal direction Y from the contour, which is a center line of the matrix in the tangential direction X, have values of a first sign (plus in FIGS. 12A through 12D); the smoothing processing is achieved by this distribution. The weighting factors for the other pixels have values of a second sign opposite to the first sign (minus in FIGS. 12A through 12D); the detail enhancement is achieved by this distribution.

Figure 13:
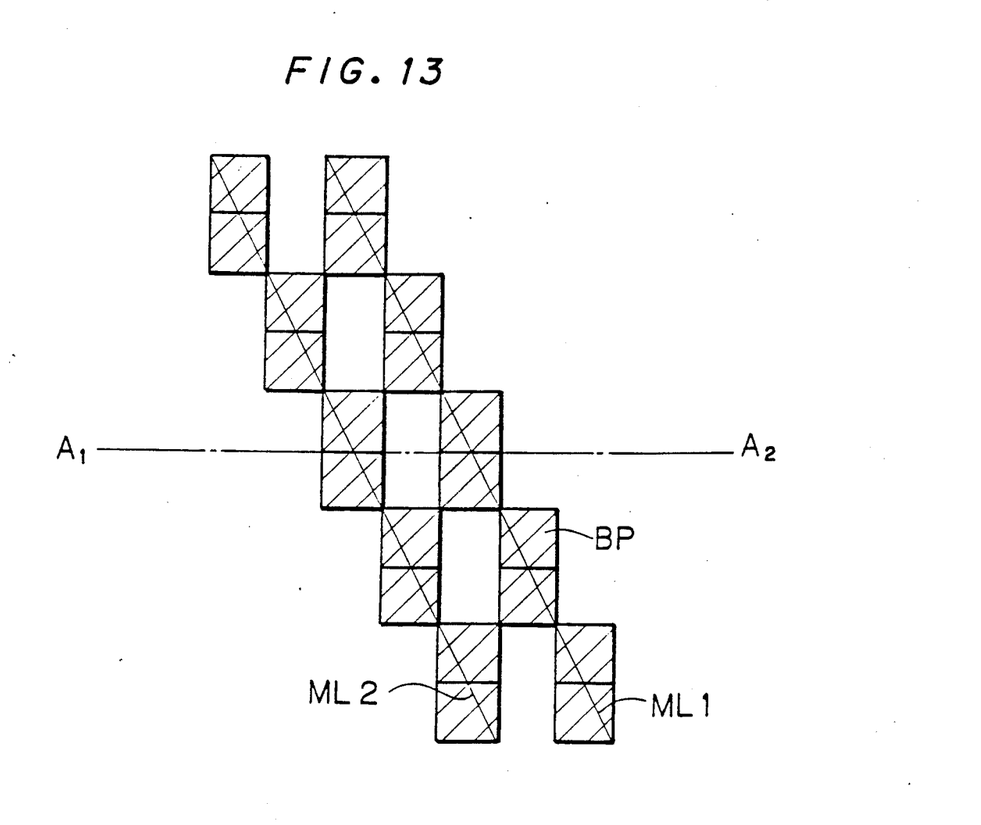
FIG. 13 illustrates an image of thin lines to which the filters of FIGS. 12A through 12D are applied.

The mask processing described above is applied especially to an image such as that of electric wires or a comb, including a few thin lines which have a width of about one pixel and which are arrayed in a parallel manner. FIG. 13 illustrates an example of such an image area. In FIG. 13, thin lines ML1 and ML2 are arrayed in a parallel manner. Shaded areas BP are exposed to be solid, to represent the thin lines ML1 and ML2.

Figure 14A:
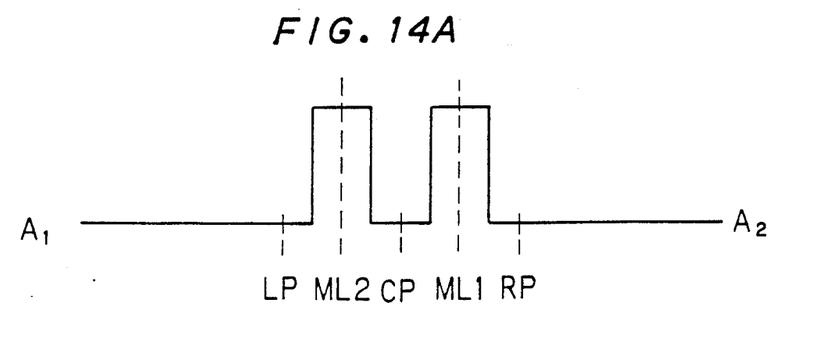
FIGS. 14A through 14C are diagrams showing density distribution of the image of FIG. 13 on a line A1-A2.
Figure 14B:
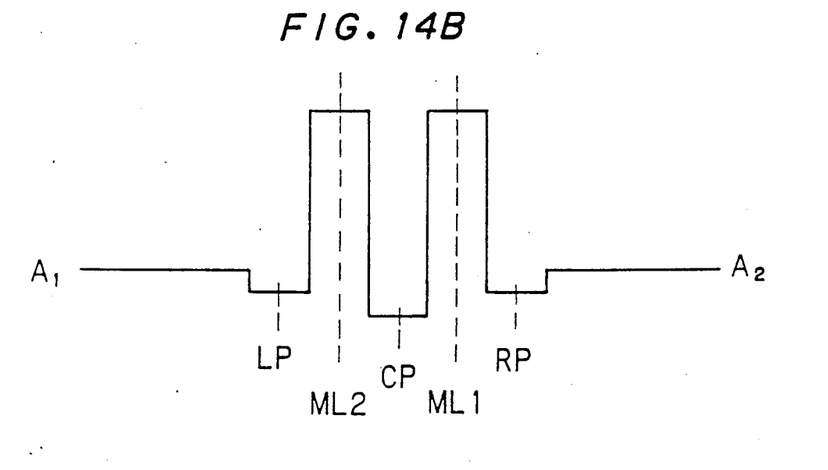
Figure 14C:
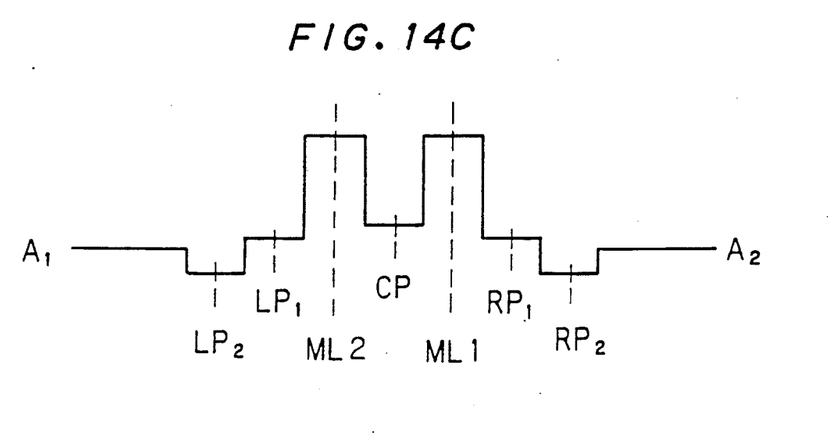

FIG. 14A is a diagram showing the density distribution on a line A1-A2 in the image area shown in FIG. 13. FIG. 14B and 14C are diagrams showing the density distribution represented by the corrected image signal obtained by performing the mask processing on the density distribution shown in FIG. 14A with the S/E filters SEF1a-SEF1d and SEF3a-SEF3d, respectively.

In FIGS. 14A through 14C, a symbol CP denotes a pixel between the thin lines ML1 and ML2, a symbol RP (RP1 and RP2 in FIG. 14C) denotes a pixel at the right hand side of the thin line ML1, and a symbol LP (LP1 and LP2 in FIG. 14C) denotes a pixel at the left hand side of the thin line ML2.

The density levels at the pixels LP, CP and RP in FIG. 14B are lower than those in FIG. 14A. As a result, differences between these density levels and the density level of the thin lines ML1 and ML2 are larger in FIG. 14B than in FIG. 14A. When this kind of density distribution is repeated, the image may seem unnatural.

Differences between the density level of the thin line ML1 and the density levels of the pixels CP and $RP_1$ in FIG. 14C are smaller than those in FIG. 14A. On the other hand, differences between the density level of the thin line ML1 and the density level of the pixel $RP_2$ in FIG. 14C are greater than that in FIG. 14A. In other words, the distribution shown in FIG. 14C, which is obtained with the S/E filters SEF3a-SEF3d, excludes too much difference in density level on the boundary of the thin lines and attains detail enhancement in the normal direction of the thin lines. Consequently, a reproduced image produced with the S/E filters SEF-3a–SEF3d seems more natural than one obtained with the S/E filters SEF1a–SEF1d.

According to the present invention, the processing with the spatial filter attains the effect of the smoothing in the tangential direction of a contour and the effect of the detail enhancement in the normal direction of a contour. As a result, a reproduced image thus processed seems sharp and natural while being prevented from the JAG.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of retouching an image through correcting image data, comprising the steps of:
   (a) preparing image data representing an image with respect to each pixel;
   (b) designating retouching area in said image to be retouched;
   (c) detecting a tangential direction of a contour included in said retouching area; and
   (d) computing a weighted mean value of said image data with respect to each pixel and a prescribed area around each pixel in said retouching area while using weighting factors distributed in said tangential direction, said weighting factors smoothing said image data in said tangential direction, thereby producing corrected image data representing a retouched image on the basis of said weighted mean value, wherein
   said weighting factors are further distributed in a normal direction perpendicular to said tangential direction, and said weighting factors enhance detail of said image in said normal direction,
   said weighting factors are arranged in a pixel matrix of a prescribed size,
   a first group of said weighting factors assigned to first pixels, which form a line of a prescribed width drawn through a central pixel of said pixel matrix in said tangential direction, has a first sign, and a second group of said weighting factors assigned to second pixels other than said first pixels in said pixel matrix has a second sign opposite to said first sign.

2. A method in accordance with claim 1, wherein said image data include a plurality of color component data, and said step (d) comprises the steps of:
   (d-1) computing a second weighted means value of said plurality of color component data with respect to each pixel in said retouching area,
   (d-2) computing said weighted mean value on the basis of said second weighted mean value, and
   (d-3) adding said weighted mean value to each of said plurality of color component data to produce said corrected image data including corrected color component data.

3. A method in accordance with claim 1, wherein said image data include a plurality of color component data, and said step (d) comprises the steps of:
   (d-1) selecting a minimum value of said color component data with respect to each pixel in said retouching area,
   (d-2) computing said weighted mean value on the basis of said minimum value, and
   (d-3) adding said weighted mean value to each of said plurality of color component data to produce said corrected image data including corrected color component data.

4. A method in accordance with claim 1, wherein said image data include a plurality of color component data, and said step (d) comprises the steps of:
   (d-1) computing said weighted mean value with respect to each of said plurality of color component data, and
   (d-2) adding said weighted mean value with respect to each of said plurality of color component data to each of said plurality of color component data to thereby produce said corrected image data including corrected color component data.

5. An apparatus for retouching an image through correcting image data, comprising:
   (a) means for storing image data representing said image with respect to each pixel;
   (b) means for detecting a tangential direction of a contour included in a retouching area in an image to be retouched, said retouching area being designated in advance; and
   (c) computing means for computing a weighted mean value of said image data with respect to each pixel and a prescribed area around each pixel in said retouching area while using weighting factors distributed in said tangential direction, said weighting factors smoothing said image data in said tangential direction, thereby producing corrected image data representing a retouched image on the basis of said weighted mean value, wherein
   said weighting factors are further distributed in a normal direction perpendicular to said tangential direction, and said weighting factors enhance detail of said image in said normal direction,
   said weighting factors are arranged in a pixel matrix of a prescribed size,
   a first group of said weighting factors assigned to first pixels, which form a line of a prescribed width drawn through a central pixel of said pixel matrix in said tangential direction, has a first sign, and a second group of said weighting factors assigned to second pixels other than said first pixels in said pixel matrix has a second sign opposite to said first sign.

6. An apparatus in accordance with claim 5, wherein said image data include a plurality of color component data, and said computing means comprises:
   (c-1) means for computing a second weighted mean value of said plurality of color component data with respect to each pixel in said retouching area,
   (c-2) means for computing said weighted mean value on the basis of said second weighted mean value, and
   (c-3) means for adding said weighted mean value to each of said plurality of color component data to produce said corrected image data including corrected color component data.

7. An apparatus in accordance with claim 5, wherein said image data include a plurality of color component data, and said computing means comprises:

(c-1) means for selecting a minimum value of said color component data with respect to each pixel in said retouching area, (c-2) means for computing said weighted mean value on the basis of said minimum value, and (c-3) means for adding said weighted mean value to each of said plurality of color component data to produce said corrected image data including corrected color component data.

8. An apparatus in accordance with claim 5, wherein said image data include a plurality of color component data, and said computing means comprises:

(d-1) means for computing said weighted mean value with respect to each of said plurality of color component data, and (d-2) means for adding said weighted mean value with respect to each of said plurality of color component data to each of said plurality of color component data to thereby produce said corrected image data including corrected color component data.

9. A method of retouching an image through correcting image data, comprising the steps of:

(a) preparing image data representing an image with respect to each pixel;

(b) designating retouching area in said image to be retouched;

(c) detecting a tangential direction of a contour included in said retouching area; and (d) computing a weighted mean value of said image data with respect to each pixel and a prescribed area around each pixel in said retouching area while using weighting factors distributed in said tangential direction, said weighting factors smoothing said image data in said tangential direction, thereby producing corrected image data representing a retouched image on the basis of said weighted mean value, wherein said detecting step comprises applying an edge detecting filter to detect said contour and to detect the tangential direction of said contour, and wherein said computing step comprises selecting a spatial filter having a smoothing direction which is the same as the tangential direction of said contour.

10. A method in accordance with claim 9, wherein said step of designating a retouching area comprises selectively designating the retouching area and where said step of detecting a tangential direction of a contour comprises detecting a tangential direction of a contour of said image included in said retouching area.

11. A method in accordance with claim 9, wherein said weighting factors are further distributed in a normal direction perpendicular to said tangential direction, and said weighting factors enhance detail of said image in said normal direction.

12. A method in accordance with claim 11, wherein said weighting factors are arranged in a pixel matrix of a prescribed size.

13. An apparatus for retouching an image through correcting image data, comprising:

(a) means for storing image data representing said image with respect to each pixel;

(b) means for detecting a tangential direction of a contour included in a retouching area in an image to be retouched, said retouching area being designated in advance; and (c) computing means for computing a weighted mean value of said image data with respect to each pixel and a prescribed area around each pixel in said retouching area while using weighting factors distributed in said tangential direction, said weighting factors smoothing said image data in said tangential direction, thereby producing corrected image data representing a retouched image on the basis of said weighted mean value, wherein said means for detecting a tangential direction comprises edge detecting means for detecting a contour of said image and for detecting the tangential direction of said contour; and said computing means comprises means for selecting a smoothing filter having a smoothing direction which is the same as the tangential direction of said contour.

14. An apparatus in accordance with claim 13, wherein said weighting factors are further distributed in a normal direction perpendicular to said tangential direction, and said weighting factors enhance detail of said image in said normal direction.

15. An apparatus in accordance with claim 14, wherein said weighting factors are arranged in a pixel matrix of a prescribed size.

16. An apparatus in accordance with claim 13, wherein said means for detecting a tangential direction comprises means for detecting a tangential direction of a contour of said image included in a retouching area selectively designated in advance.

* * * * *